(12) United States Patent
Wood

(10) Patent No.: US 9,602,387 B2
(45) Date of Patent: Mar. 21, 2017

(54) NETWORK TOPOLOGY OPTIMIZATION

(71) Applicant: Juniper Networks, Inc., Sunnyvale, CA (US)

(72) Inventor: David Wood, Woodbridge (GB)

(73) Assignee: Juniper Networks, Inc., Sunnyvale, CA (US)

( * ) Notice: Subject to any disclaimer, the term of this patent is extended or adjusted under 35 U.S.C. 154(b) by 116 days.

(21) Appl. No.: 14/586,464

(22) Filed: Dec. 30, 2014

(65) Prior Publication Data

US 2016/0191370 A1  Jun. 30, 2016

Related U.S. Application Data

(63) Continuation-in-part of application No. 14/585,170, filed on Dec. 29, 2014.

(51) Int. Cl.
*H04L 12/751* (2013.01)
*H04L 12/801* (2013.01)
(Continued)

(52) U.S. Cl.
CPC .......... *H04L 45/02* (2013.01); *H04L 41/0816* (2013.01); *H04L 41/0826* (2013.01);
(Continued)

(58) Field of Classification Search
CPC ..... H04L 45/02; H04L 47/12; H04L 41/0816; H04L 41/0826; H04L 47/125; H04L 41/12
(Continued)

(56) References Cited

U.S. PATENT DOCUMENTS 6,778,531 B1  8/2004  Kodialam et al.
7,715,369 B1  5/2010  Wang et al.
(Continued)

FOREIGN PATENT DOCUMENTS

WO  2013091688 A1  6/2013
WO  2013184846 A1  12/2013

OTHER PUBLICATIONS

Andersson et al., "LDP Specification," Network Working Group, rfc 3036, Standards Track, Jan. 2001, 133 pp.
(Continued)

*Primary Examiner* — Charles C Jiang
*Assistant Examiner* — Wali Butt
(74) *Attorney, Agent, or Firm* — Shumaker & Sieffert, P.A.

(57) ABSTRACT

In some examples, a controller for a multi-layer network comprising a network layer and an underlying transport layer is configured to obtain abstract link data describing a plurality of candidate links; determine, based at least on the abstract link data, a first solution comprising a network topology for the network layer that includes a first selected subset of the candidate links; determine, after generating a modified network topology based at least on the network topology and the abstract link data, a second solution comprising the modified network topology for the network layer that includes a second selected subset of the candidate links; and output, for configuring the multi-layer network, topology data for one of the first solution or the second solution having a lowest total cost, the lowest total cost including a total resource cost to the network for the one of the first solution or the second solution.

18 Claims, 8 Drawing Sheets

(51) Int. Cl.
*H04L 12/24* (2006.01)
*H04L 12/18* (2006.01)

(52) U.S. Cl.
CPC ............ *H04L 41/12* (2013.01); *H04L 41/145* (2013.01); *H04L 47/12* (2013.01); *H04L 12/18* (2013.01)

(58) Field of Classification Search
USPC ....... 370/217, 228, 235, 238, 254, 329, 389, 370/395.2; 398/58, 79; 455/509; 709/221, 240
See application file for complete search history.

(56) References Cited

U.S. PATENT DOCUMENTS

| | | | |
|---|---|---|---|
| 9,369,338 B1* | 6/2016 | Krishnaswamy | H04L 41/0668 |
| 2004/0083277 A1 | 4/2004 | Chaporkar et al. | |
| 2012/0213224 A1 | 8/2012 | Chen | |
| 2013/0252653 A1* | 9/2013 | Aragon | H04W 72/082 455/509 |
| 2014/0099119 A1 | 4/2014 | Wei et al. | |
| 2014/0119181 A1* | 5/2014 | Jain | H04L 45/125 370/235 |
| 2014/0204794 A1 | 7/2014 | El-Najjar et al. | |
| 2015/0003283 A1 | 1/2015 | Previdi et al. | |
| 2016/0087849 A1* | 3/2016 | Balasubramanian | H04L 41/12 709/221 |

OTHER PUBLICATIONS

Bousser et al., "Multilayer Design to Achieve Reliable and Resource Efficient Super-Core Networks," Abstract, WANDL Inc., MPLS Ethernet World Congress, Mar. 2013, 1 pp.
"Juniper Adva Packet Optical Convergence: Reducing Total Cost of Ownership in De-layered Networks," Juniper Networks, Inc., Whitepaper, Sep. 2014, 18 pp.
U.S. Appl. No. 14/042,614, by Nitin Bahadur, filed Sep. 30, 2013.
U.S. Appl. No. 14/500,736, by David Wood, filed Sep. 29, 2014.
U.S. Appl. No. 14/585,170, by David Wood, filed Dec. 29, 2014.
Wood et al., "Multilayer IP-over-Transport Network Design," May 2012, 29 pp.
Extended Search Report from counterpart European Application No. 15201555.8, dated Feb. 25, 2016, 10 pp.
Lee et al., "A Survey of Multipath Routing for Traffic Engineering," Information and Communications University (ICU), Jan. 2002, 27 pp.
Kodialam et al., "Dynamic Routing of Bandwidth Guaranteed Multicasts with Failure Backup," Proceedings of the 10th International Conference on Network Protocols (ICNP'02), Nov. 12-15, 2002, 10 pp.
Donoso et al., "A Multi-Objective Optimization Scheme for Multicast Routing: A Multitree Approach," Telecommunications Systems, vol. 27 Issue 2-4, Oct. 2004, 23 pp.
Din, "Genetic Algorithm for Finding Minimal Cost Light-forest of Multicast Routing on WDM Networks," Artificial Intelligence Review, vol. 29 No. 3-4, Nov. 1, 2009, pp. 195-222.
Razo et al., "The PlaNet-PTN Module: A Single Layer Design Tool for Packet Transport Networks," Computer Aided Modeling and Design of Communication Links and Networks, Jun. 12, 2009, 5 pp.
Extended Search Report from counterpart European Application No. 15201589.7, dated Feb. 25, 2016, 10 pp.
Johnston et al., "A Robust Optimization Approach to Backup Network Design with Random Failures," IEEE/ACM Transactions on Networking, Aug. 2015, 9 pp.
Extended Search Report from counterpart European Application No. 15201579.8, dated Feb. 26, 2016, 10 pp.
Office Action from U.S. Appl. No. 14/585,170, dated Dec. 1, 2016, 33 pp.
Office Action from U.S. Appl. No. 14/788,602, dated Dec. 1, 2016, 8 pp.
Response to Communication pursuant to 69 EPC dated Jul. 11, 2016, from counterpart European Application No. 15201555.8, filed Jan. 3, 2017, 7 pp.
Response to Communication pursuant to 69 EPC dated Jul. 11, 2016, from counterpart European Application No. 15201579.8, filed Jan. 4, 2017, 7 pp.
Response to Communication pursuant to 69 EPC dated Jul. 11, 2016, from counterpart European Application No. 15201589.7, filed Jan. 4, 2017, 9 pp.

* cited by examiner

NETWORK TOPOLOGY OPTIMIZATION

CROSS REFERENCE TO RELATED APPLICATIONS

This application is a continuation-in-part of application Ser. No. 14/585,170, filed Dec. 29, 2014, which is incorporated herein by reference in its entirety.

TECHNICAL FIELD

The invention relates to computer networks and, more specifically, to determining a computer network topology.

BACKGROUND

Routing devices within a network, often referred to as routers, maintain tables of routing information that describe available routes through the network. Network routers maintain routing information that describes available routes through the network. Upon receiving a packet, a router examines information within the packet and forwards the packet in accordance with the routing information. In order to maintain an accurate representation of the network, routers exchange routing information in accordance with one or more routing protocols, such as an interior gateway protocol (IGP) or Border Gateway Protocol (BGP).

The term "link" is often used to refer to the connection between two devices on a network. The link may be a physical connection such as a copper wire, a coaxial cable, any of a host of different fiber optic lines or a wireless connection. In addition, network devices may define "virtual" or "logical" links, and map the virtual links to the physical links. In other words, the use of virtual links provides a degree of abstraction. As networks grow in size and complexity, the traffic on any given link may approach a maximum bandwidth capacity for the link, thereby leading to congestion and loss.

SUMMARY

In general, techniques are described for dynamically determining a logical network topology for efficiently transporting network traffic over a physical topology based on end-to-end network traffic demands. The techniques may be applicable in a multi-layer network having a base transport layer and a logical or overlay Internet Protocol (IP) layer routed on the transport layer to meet network traffic demands placed upon the multi-layer network.

In one example, a controller for a multi-layer network determines a logical network topology for transporting a traffic demand matrix, the logical network topology is determined to ensure sufficient capacity in the event of a failure of any base layer component and to facilitate an optimized total resource cost to the network for transporting the traffic. The controller obtains abstract link data describing a set of candidate links available for use as links in the network topology. The controller may also obtain abstract link data describing the shared-risks encountered by these candidate links on their physical (transport) paths, as well as information relevant to path optimization such as the physical length or delay of the link in some cases. The controller iteratively analyzes candidate links and abstract link data in view of the traffic demand matrix to select a subset of the candidate links to efficiently and robustly carry the demands. As part of its design output, the controller may signal to the network (or the network operator) the information required to configure and activate any of these selected subset of candidate links that are not already activated and configured.

The techniques may provide one or more advantages. For example, a controller that applies the above-described techniques may facilitate, with each iteration, movement toward global optimization along the total cost of solutions gradient for a traffic demand matrix with respect to a total cost to the network. In some examples, the controller applying the techniques described herein may further facilitate that the selected subset of candidate links is able to carry the demands under any single element failure, while also satisfying other constraints applied to the network, such as delays and the number of next hops for a given path through the network. While the globally-optimal solution may not be reached in all cases, the techniques may avoid at least some local minima on the total cost of solutions gradient, which may result in robust yet lower resource cost solutions.

In one example, a method comprises obtaining, by a controller of a multi-layer network comprising a network layer and an underlying transport layer, abstract link data describing a plurality of candidate links, wherein each candidate link of the plurality of candidate links is routed in the transport layer and usable in network topologies for the network layer; determining, by the controller based at least on the abstract link data, a first solution comprising a network topology for the network layer that includes a first selected subset of the candidate links; determining, by the controller after generating a modified network topology based at least on the network topology and the abstract link data, a second solution comprising the modified network topology for the network layer that includes a second selected subset of the candidate links; and outputting, by the controller for configuring the multi-layer network, topology data for one of the first solution or the second solution having a lowest total cost, the lowest total cost including a total resource cost to the network for the one of the first solution or the second solution.

In another example, a controller for a multi-layer network comprising a network layer and an underlying transport layer, the controller comprising one or more processors coupled to a memory; a topology computation module configured for execution by the one or more processors to: obtain abstract link data describing a plurality of candidate links, wherein each candidate link of the plurality of candidate links is routed in the transport layer and usable in network topologies for the network layer; determine, based at least on the abstract link data, a first solution comprising a network topology for the network layer that includes a first selected subset of the candidate links; and determine, after generating a modified network topology based at least on the network topology and the abstract link data, a second solution comprising the modified network topology for the network layer that includes a second selected subset of the candidate links; and a topology provisioning module configured for execution by the one or more processors to output, for configuring the multi-layer network, topology data for one of the first solution or the second solution having a lowest total cost, the lowest total cost including a total resource cost to the network for the one of the first solution or the second solution.

In another example, a non-transitory computer-readable medium contains instructions for causing one or more programmable processors of a controller of a multi-layer network comprising a network layer and an underlying transport layer: obtain abstract link data describing a plurality of candidate links, wherein each candidate link of the plurality of candidate links is routed in the transport layer and usable in network topologies for the network layer; determine, based at least on the abstract link data, a first solution comprising a network topology for the network layer that includes a first selected subset of the candidate links; determine, after generating a modified network topology based at least on the network topology and the abstract link data, a second solution comprising the modified network topology for the network layer that includes a second selected subset of the candidate links; and output, for configuring the multi-layer network, topology data for one of the first solution or the second solution having a lowest total cost, the lowest total cost including a total resource cost to the network for the one of the first solution or the second solution.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
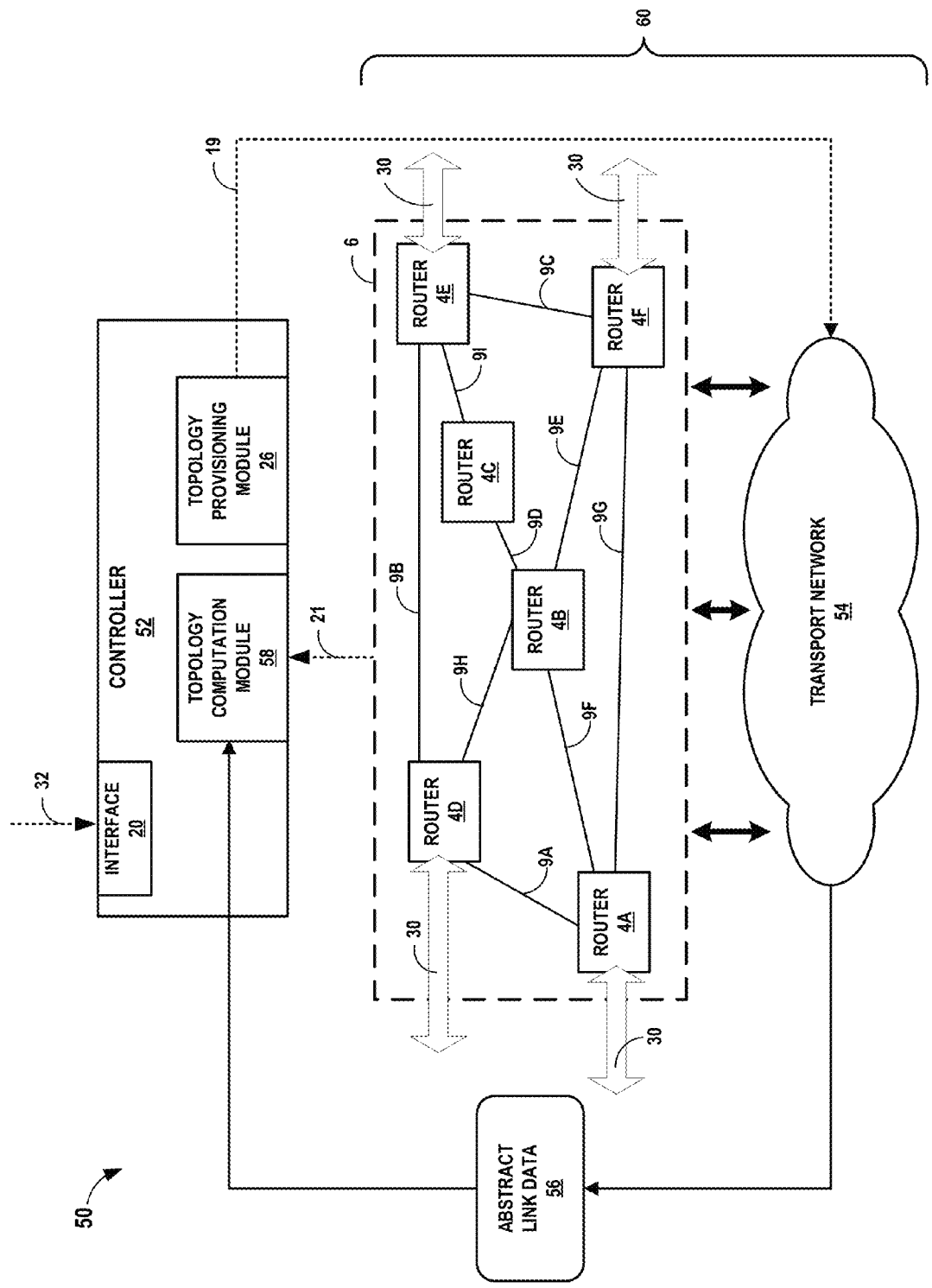
FIG. 1 is a block diagram illustrating an example network system in which a controller obtains abstract link data for a multi-layer network and uses the abstract link data to determine logical links for a logical network layer in the multi-layer network, in accordance with techniques described in this disclosure.

FIG. 1 is a block diagram illustrating an example network system 50 in which a controller obtains abstract link data for a multi-layer network and uses the abstract link data to determine logical links for a logical network layer in the multi-layer network, in accordance with techniques described in this disclosure. In this example, multi-layer network 60 includes logical network 6 and transport network 54. Transport network 54 represents an optical transport network (OTN) or other transport network underlying network 6. Network 6 includes routers 4A-4F (collectively "routers 4") to control switching and routing of packet flows. Network 6 may represent an Internet Protocol (IP) network. Examples of routers 4 include layer 3 (L3) routers and layer 2 (L2) switches or L2/L3 switches that collectively provide network 6. That is, network 6 typically provides L2/L3 traffic forwarding services, such as traffic engineering via Multiprotocol Label Switching traffic-engineered (MPLS-TE) including label switched paths (LSPs), Virtual Local Area Network (VLANs), and so forth. Various examples of network 6 may encompass many hundreds or even thousands of routers/switches.

Underlying transport network 54 transports, multiplexes, and switches packet-based communications through high-speed optical fiber links. Transport network 54 may include multiple optical communication devices (e.g., packet-optical transport devices) interconnected via optical links and controlling transmission of optical signals carrying packet data along the optical links. In this way, transport network 54 provides a physical layer that physically interconnects routers 4 of network 6.

Although not shown in FIG. 1 for simplicity, packet-optical transport devices may be, for example, ROADMs, PCXs, wavelength-division multiplexing (WDM)/dense WDM (DWDM), and time-division multiplexing (TDM)-based devices, optical cross-connects (OXCs), optical add-drop multiplexers (OADMs), multiplexing devices, or other types of devices or other devices that transmit, switch and/or multiplex optical signals. As one example, routers 4 may be layer three (L3) routers optically connected by intermediate OXCs of transport network 54, such as OXCs to which the routers 4 have access links.

Transport network 54 typically includes a number of other components, such as amplifiers, transponders, OTTs, repeaters and other equipment for controlling transmission of optical packet data along optical links (also not shown). Large optical transport systems may have significant numbers of such devices that influence optical transmissions. Although described with respect to only optical links, transport system 54 may include other types of physical links as well, such as Ethernet PHY, Synchronous Optical Networking (SONET)/Synchronous Digital Hierarchy (SDH), Lambda, or other Layer 2 data links that include packet transport capability.

Routers 4 are members of a path computation domain served by controller 52. The path computation domain may include, for example, an Interior Gateway Protocol (e.g., Open Shortest Path First (OSPF) or Intermediate System-to-Intermediate System (IS-IS)) area, an Autonomous System (AS), multiple ASes within a service provider network, multiple ASes that span multiple service provider networks. In various examples, different combinations of routers 4 may include member routers of multiple ASes. Network links connecting routers 4 may thus be interior links, inter-AS transport links, another type of network link, or some combination thereof.

Logical network 6 is in effect an overlay network "built on top of" underlying transport network 54. Routers 4 are connected by virtual or logical links (an example topology for which is illustrated in FIG. 1 with links 9A-9I (collectively "links 9")), each of which corresponds to a path in the underlying transport network 54. Each path may include one or more physical links of the transport network 54 (again, such physical links not shown in FIG. 1).

In some example implementations, controller 52 provides integrated control over both routers 4 and packet-optical transport devices underlying transport network 54 with respect to transport of packet data through the optical links and other equipment. For example, controller 52 may not only control routing and traffic engineering operations of network 6 but may also provide integrated control over allocation or utilization of the optical spectrum and wavelengths utilized by each packet-optical transport device within transport network 54 that underlies the elements of network 6, or controller 52 may use the path or abstract link information from the transport layer to select candidate links for routing on the transport network 54.

Controller 52 may represent a high-level controller for configuring and managing network 6. Controller 52 may represent one or more general-purpose servers; an appliance, controller, or other special-purpose device for computing paths; an application executed by a computing device; a distributed control plane of routers 4 that computes paths for LSPs managed by the routers; and so forth. In some cases, aspects of controller 52 may be distributed among one or more real or virtual computing devices. Any such devices listed above may be in-network or out-of-network with regard to network 6. Example details of a software-defined networking (SDN) controller for a software-defined network, which may perform operations described herein to compute paths and route LSPs, are described in PCT International Patent Application PCT/US2013/044378, filed Jun. 5, 2013, and entitled, "PHYSICAL PATH DETERMINATION FOR VIRTUAL NETWORK PACKET FLOWS," which is incorporated by reference herein in its entirety. Additional examples details of an SDN controller for a software-defined network to obtain topology information for and to provision a network are described in U.S. patent application Ser. No. 14/042,614, filed Sep. 30, 2013, and entitled "SOFTWARE DEFINED NETWORK CONTROLLER," and U.S. patent application Ser. No. 14/500,736, filed Sep. 29, 2014, and entitled "BATCHED PATH COMPUTATION IN RESOURCE-CONSTRAINED NETWORKS," which are both incorporated by reference herein in their entireties.

Controller 52 may obtain traffic engineering information 21 for network 6 by executing one or more network routing protocols, extended to carry traffic engineering information, to listen for routing protocol advertisements that carry such traffic engineering information. Traffic engineering information may include node and interface identifiers for routers 4; administrative weights and available bandwidth per priority level for links; LSP identifier and state information for virtual links, and other information for computing paths for traffic engineered LSPs. Controller 52 may store traffic engineering information to a traffic engineering database (TED).

Controller 52 in this example presents northbound interface 20 that may be invoked by other controllers in a hierarchical arrangement of controllers or by an orchestrator, administrator, application, or other entity, to present traffic demands 32 for network 6. Interface 20 may be usable for integration with an orchestration system such as OpenStack; interface 20 may also or alternatively usable by other applications or the operator's Operations Support Systems (OSS)/Business Support Systems (BSS). Interface 20 may in some cases present a RESTful Application Programming Interface (API).

A traffic demand corresponds to an end-to-end traffic flow 30 traversing network 6 from one of routers 4 at the network 6 edge to another of routers 4 at the network 6 edge. In the illustrated example, routers 4A, 4D, 4E, and 4F are logically located at the network 6 edge and thus ingress and/or egress traffic flows 30 for transport across network 6.

The traffic demand may be defined according to an expected traffic bandwidth that is to be routed (or re-routed) by the network 6 from a source node to a destination node. In some cases, the traffic demand may be associated with timing/calendaring information that defines an interval during the expected traffic bandwidth will be received by network 6 for transport. A traffic flow corresponds to one or more network packets that each matches a set of one or more properties. Different packet flows may be classified using different properties and property values. For example, some packet flows may be identified as matching a standard 5-tuple (or subset thereof) consisting of transport layer protocol (e.g., User Datagram Protocol (UDP) or Transmission Control Protocol (TCP), source IP address, destination IP address, source port, destination port. Packet flows may also be distinguishable from one another by application protocol (e.g., LDP, ARP, OSPF, BGP, etc.) and/or MPLS labels, for example.

Controller 52 may in some cases determine traffic demands based on current traffic demands being experienced by network 6, in which case controller 52 may apply the techniques described herein in near-real-time to modify a network 6 topology to potentially improve the traffic routing. In some cases, controller 52 may receive via interface 20 or estimate projected demands based on patterns of demands previously experienced by network 6, upcoming application activation, or other known and/or expected changes to the traffic demand patterns, such as changing the peering point for the entry to the network of data from a major customer, adding a new node or point of presence, merging two or more networks, and so forth. For example, controller 52 or another controller may analyze traffic LSP statistics and trends to project future traffic demands on network 6. These may be useful for long-term planning for network 6.

The various traffic demands form a traffic demand matrix of traffic demands from the various possible source/ingress routers 4 to the various possible destination/egress routers 4. In accordance with techniques described herein, controller 52 includes topology computation module 58 that determines a topology of network links 9 for network 6 by which routers 4 may switch network traffic flows 30 in order to meet the traffic demands corresponding to the traffic flows 30.

Topology computation module 58 may determine the logical network topology for network 6 to ensure sufficient capacity in the event of a failure of components of transport network 54 and to facilitate an optimized total resource cost to the network 6 for transporting the traffic. Topology computation module 58 obtains a set of candidate links available for use as network links in network 6. Topology computation module 58 additionally, in some instances, obtains abstract link data 56 describing the shared-risks encountered by these candidate links on their physical (transport) paths. In some cases, abstract link data 56 also defines the available candidate links and may define additional abstract links already configured and activated in network 6. Abstract link data 56 is, in other words and in such cases, the mechanism by which topology computation module 58 obtains the set of candidate links. Abstract link data 56 may further include information relevant to path optimization such as the physical length or delay of the link in some cases.

Abstract link data 56 in this way represents data "leaked" in some manner from the transport network 54 to controller 52 to enable the application of further constraints by topology computation module 58 to the determination of paths and corresponding candidate links on which to route traffic. Such constraints may correspond to the types of abstract link data 56, which may include available candidate links, link lengths, link metrics (which may be based on link lengths), link costs (which may also be based on link lengths), and a list of Shared Risk Link Groups (SRLGs) for links.

Topology computation module 58 may obtain abstract link data 56 in some cases by building additional candidate links for the controller 52 to use (if required and if the use of such links would result in a lower-cost overall solution) based on user-defined or application-defined rules set in data files and configured in controller 52 for controlling transport network 54. In other words, controller 52 may build candidate links from candidate link definitions obtained by controller 52. For example, a user or application may define groups of packet-optical transport devices as types of nodes within transport network 54, e.g., access nodes, core nodes, and supercore nodes and may indicate the circumstances in which the packet-optical transport devices allow connections within a group or between groups. For instance, the rules may specify:

Access nodes can connect to the three nearest core nodes.

Core nodes can connect to the two nearest other core nodes.

Core nodes can connect to the two nearest supercore nodes.

Any supercore node can connect to any other.

The above rules are merely examples. The defined rules may also define the administrative weighting scheme usable by the software to transport the traffic if a candidate link is used to transport traffic. With regard to the above, the defined rules determine only candidate links and do not specify that such links must be used to transporting traffic. After applying techniques described herein to determine paths for links for a network 6 topology, controller 52 may configure only the selected subset of the available links indicated in the candidate links for use in transporting traffic. In addition, controller 52 may be unable to add links to a given solution if such links are not in the collection generated in the candidate link sets. By contrast, topology computation module 58 may use links already defined for network 6 even if such links are not in the candidate link set. In other words, topology computation module 58 may be unable to use links in determining a solution unless the links are defined either in the candidate link set or already exist in the network 6.

Controller 52 may route the available candidate links in transport network 54 to determine their actual physical lengths and the shared-risks (SRLGs), for instance, in the link paths in the transport network 54. Paths for such links may be pre-computed prior to choosing the candidate links, as described in further detail below. Because the shortest path for a transport route may be excessively restrictive for purposes of failure resiliency, e.g., to protect against a failure of an SRLG from a transport link, topology computation module 58 may determine multiple paths for a given candidate link from which topology computation module 58 may choose. In some examples, the multiple paths for a given link may include the shortest path, the shorter of two diverse paths, and the longer of two diverse paths. While the shortest path and the shorter of two diverse paths may be identical, this need not necessarily be the case. Controller 52 may determine the diverse paths using a strong diverse path algorithm suitable for finding shortest diverse-cycle paths and taking account of SRLGs if available. In some cases, a logical link such as any of links 9 may already be configured in network 6 (i.e., "exist"), and the path for the logical link in transport layer 54 may be obtained by controller 52. In such cases, the known path can be fixed and the diverse paths describe above may not be determined or utilized by topology computation module 58. Additional details regarding example techniques for computing diverse paths are described in David Wood & Ping Wang, U.S. patent application Ser. No. 14/585,170, filed Dec. 29, 2014, and entitled "POINT-TO-MULTIPOINT PATH COMPUTATION FOR WIDE AREA NETWORK OPTIMIZATION," which is incorporated by reference herein in its entirety.

Because in some cases paths for links chosen from the candidate set or pre-computed prior to iteratively determining solutions for traffic demand matrix, topology computation module 58 may in some embodiments avoid attempting to design the paths for the links in such a manner as to account for available wavelengths in the transport network 54 elements. This, in effect, allows topology computation module 58 to assume the optical (e.g., WDM) capacity does not limit the determination of solutions for the demands.

Upon selecting a candidate link, controller 52 may map the routed path for the candidate link to SRLG information for transport link sections or nodes having the SRLG information and underlying the path (i.e., transporting traffic in the transport network 54 to effectuate the path). Controller 52 may in some cases prune the set of candidate links based on the number of routers 4 the links "bypass" in the transport network, which may allow the candidate link set to be reduced on the basis of the transport link topology and the equipment rather than merely on the basis of length. This may further enable realistic modelling of core IP networks made up of high-speed routers having only direct lambda optical connections or a restricted set of connections that are limited to bypass only a small number of nodes. Thus, all IP-Layer links whose routes bypass these high-speed routers may be pruned from the candidate set of links.

As noted above, topology computation module 58 may obtain abstract link data 56 from an abstract link file or other data structure obtained from, e.g., a third-party network management system for transport network 54 or built by a user. Topology computation module 58 may in this way obtain an abstract picture of the transport layer represented here by transport network 54 but remain unaware of the details of the transport network 54 topology. In other words, topology computation module 58 may have a restricted or merely abstract picture of the transport network, taken via abstract link data 56 from a transport network 54 controller or derived from an export of a transport network 54 network management system (NMS), for instance. Obtaining abstract link data 56 in this way may be advantageous, for the rules defining whether candidate links are or are not available depend upon the particularities of the various packet-optical transport devices employed in transport network 54. Obtaining candidate links directly as a set of "abstract links" from an abstract link file may enable more-complex constraints on the connections than are possible using relatively simple formulae for candidate link generation as described above.

As noted above, abstract link data 56 may include link information for available candidate links such as link lengths, link metrics, link costs, and/or a list of Shared Risk Link Groups (SRLGs) for links. In order to perform designs that take into account potential failure modes in the transport network of fiber-cuts, or WDM/optical component failures, as well as failures of devices and interfaces in the IP layer, the topology computation module 58 may account for the transport layer equipment used by the IP links by applying penalties to links according SRLGs. Controller 52 may, for instance, obtain the SRLG information for transport layer elements corresponding to candidate links identified in abstract link data 56. Such SRLG information could be for fiber sections, conduit (ducts) carrying the fibers, transport layer switching elements, and so forth. Controller 52 may obtain such SRLG information for any existing links in network 6. Controller 52 may obtain such SRLG information for existing links to understand the failure modes of the network 6 modified to include candidate links described in abstract link data 56 and selected by topology computation module 58 during an iteration for determining solutions for the traffic demand matrix according to techniques described herein.

With regard to the above, resiliency mechanisms need to rely on predicting which resources have a high likelihood to fail contemporaneously in order to correctly assign redundant routes. In a simple network, a node or a link between nodes may fail due to a local failure. However in a packet/optical network, a single fiber cut of a DWDM link would affect all wavelengths transported. Moreover, each individual wavelength may connect different pairs of routers such that a single fiber cut in the optical network appears to be a triple or quadruple failure in the network topology, as may occur when there are more than two layers, e.g., IP over SDH over WDM (SDH over WDM representing transport network 54 in this example).

To cope with such situations, an SRLG or a set of SRLGs is assigned as a link attribute. An SRLG may be, for instance, represented by a 32-bit number unique within an IGP (OSPFv2 and IS-IS) domain, such as network 6 or an IGP within network 6 where network 6 encompasses multiple domains. A link may be assigned multiple SRLGs. The SRLG of a path in a label-switched path (LSP) is the set of SRLGs for all the links in the path. Topology computation module 58 may use SRLG information provided in abstract link data 56 when determining paths for candidate links. In general, when computing diverse paths for a candidate link, it is preferable to find paths such that the primary and secondary paths do not have any links in common in case the SRLGs for the primary and secondary paths are disjoint. This ensures that a single point of failure on a particular link does not bring down both the primary and secondary paths. By comparing the SRLG attributes of links, a topology computation module 58 can apply penalties during an iteration to facilitate disjoint SRLG attributes between the sets of links for the primary path and the secondary path and in this way arrive at diverse failure routes.

As a prerequisite, SRLGs of the optical domain represented by transport network 54 must be leaked into the packet domain represented by network 6. SRLGs may thus enable synchronizing routing decisions between layers of multi-layer network 60. Moreover, the nature of SRLG information is layer independent and can therefore be used as common reference information for routing at any layer.

In addition to or alternatively to representing shared risks for the abstract links, abstract link data 56 may indicate resource constraints for a given set of the abstract links (or an SRLG that contains a set of the abstract links) A resource constraint for the set of abstract links may specify that only a specified number of abstract links from the set may be selected for use in a network topology for network 6. For example, a particular fiber section in transport network 54 may have a limit of 40 wavelengths for carrying network links activated on the fiber section. By specifying a resource constraint of 40, e.g., on a particular set of candidate links that traverse the fiber section, the abstract link data 56 may ensure that only a maximum of 40 of the particular set of candidate links may be selected by topology computation module 58 for activation in the network 6.

Topology computation module 58 iteratively analyzes candidate links and abstract link data in view of the traffic demand matrix to select a subset of the candidate links to efficiently and robustly carry the demands. In response to topology computation module 58 determining a logical network topology made up of the selected subset of candidate links, the topology provisioning module 26 may signal, to transport network 54 (or to the network operator), determined network topology information 19 required to route the selected subset of candidate links as demands in the transport layer represented by transport network 54. Network topology information 19 may include the selected subset of the candidate links. The selected subset of the candidate links may be expressed in network topology information 19 as a set of demands for the transport network 54.

By applying techniques described in this disclosure, controller 52 may facilitate global optimization, with respect to a total cost to the network, of the network 6 topology for the satisfaction of a traffic demand matrix. In some examples, controller 52 may further facilitate a configuration of the network 6 able to carry the traffic demand matrix under any single element failure, while also satisfying other constraints applied to the network 6, such as delays, the number of next hops, the total resources defined as available in specific places on the network, etc., for a given path through the network; or applying penalties to the overall cost if the intermediate solution does not meet these requested constraints. While the globally-optimal solution may not be reached in all cases, the techniques may avoid at least some local minima on the total cost of solutions gradient, which may result in robust yet lower resource cost solutions.

Figure 2:
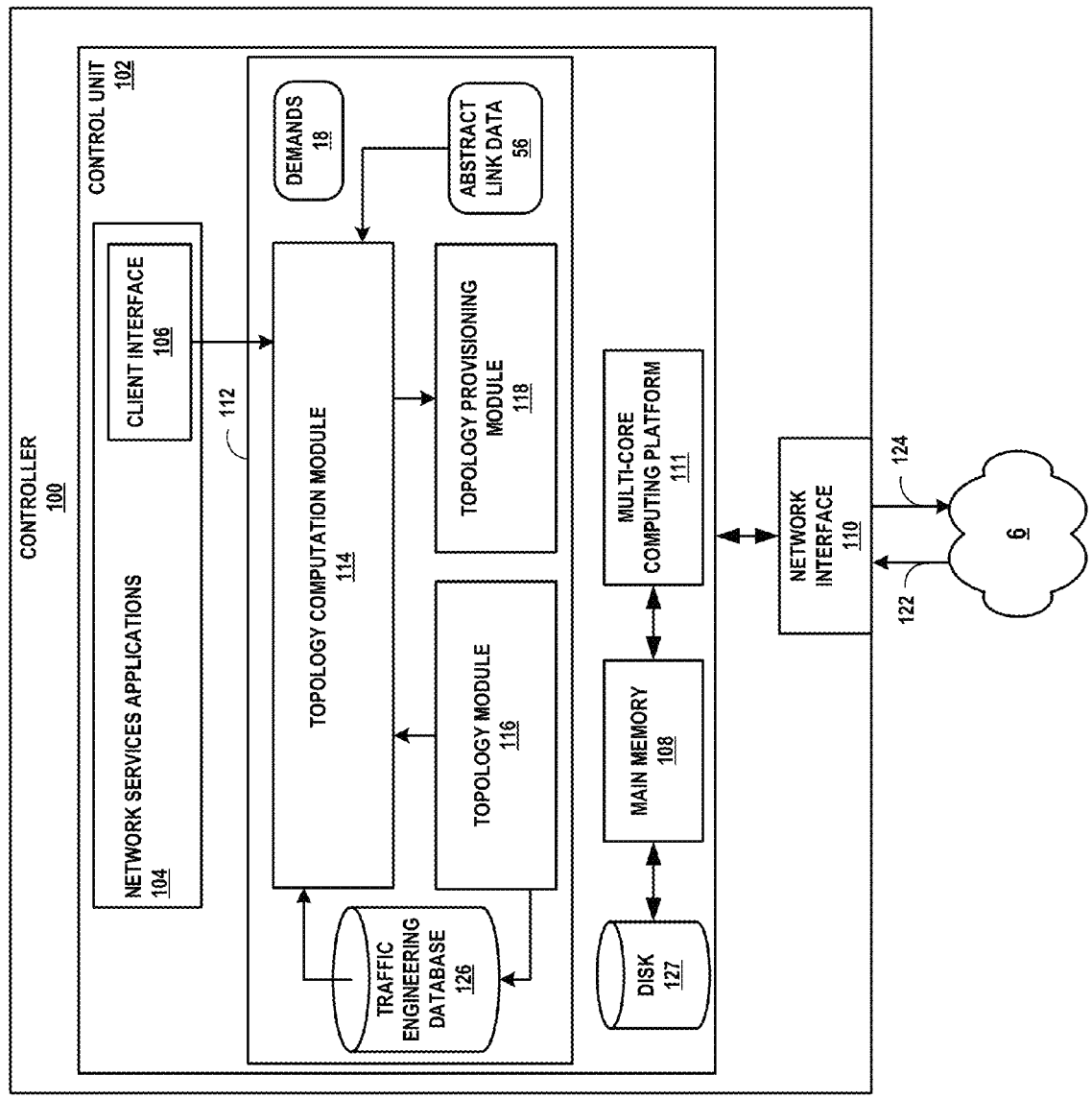
FIG. 2 is a block diagram illustrating an example controller configured to determine a logical network topology for routing traffic flows, in accordance with techniques of this disclosure.

FIG. 2 is a block diagram illustrating an example controller configured to determine a logical network topology for routing traffic flows, in accordance with techniques of this disclosure. In response to receiving demands, controller 100 computes and outputs a logical network topology that meets the traffic demand matrix for the network 6. Controller 100 may include a server or network controller, for example, and may represent an example instance of controller 52 of FIG. 1.

Controller 100 includes a control unit 102 coupled to a network interface 110 to exchange packets with other network devices by one or more inbound links 122 and one or more outbound links 124. Main memory 108 of control unit 102 represents one or more computer-readable storage media, which may include random-access memory (RAM) such as various forms of dynamic RAM (DRAM), e.g., DDR2 SDRAM, or static RAM (SRAM), Flash memory, or any other form of fixed or removable storage medium that can be used to carry or store desired program code and program data in the form of instructions or data structures and that can be accessed by a computer. Main memory 108 provides a physical address space composed of addressable memory locations accessible by modules 112, 104.

Main memory 108 is coupled to disk 127, which may comprise computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store data and instructions.

Control unit 102 in this example includes multi-core computing platform 111 to execute modules 104, 112. Multi-core computing platform includes multiple processing cores that each includes an independent execution unit to perform instructions that conform to an instruction set architecture for the core. Cores of multi-core computing platform 111 may each be implemented as separate integrated circuits (ICs) or may be combined within one or more multi-core processors (or "many-core" processors) that are each implemented using a single IC (i.e., a chip multiprocessor).

Multi-core computing platform 111 executes software instructions, such as those used to define a software or computer program, stored to main memory 108. Alternatively or additionally, control unit 102 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 102 provides an operating environment for network services applications 104 and topology element 112. In some examples, these modules may be implemented as one or more processes executing on one or more virtual machines of one or more servers. That is, while generally illustrated and described as executing on a single controller 100, aspects of modules 104, 112 may be executed on other computing devices or on different virtual machines of one or more computing devices.

Network services applications 104 represent one or more processes that provide services to clients of a service provider network that includes network 6 and controller 100 to manage connectivity in the path computation domain. Network services applications 104 may provide, for instance, include movie, television, or other media content distribution, Voice-over-IP (VoIP), Video-on-Demand (VOD), bulk transport, walled/open garden, IP Mobility Subsystem (IMS) and other mobility services, and Internet services to clients of a service provider network controlled at least in part by controller 100. Networks services applications 104 may issue demands to topology element 112 to request transport services of network 6. One or more of network services applications 104 may include or otherwise make use of a client interface 106 by which one or more client applications request transport services. Client interface 106 may represent a command line interface (CLI) or graphical user interface (GUI), for instance. Client 106 may also, or alternatively, provide an application programming interface (API) such as a web service to client applications.

Network services applications 104 may issue demands to topology element 112 to request respective paths in a path computation domain controlled by controller 100 from sources to destinations. For example, a demand may include a required bandwidth or other constraint and two endpoints representing a source and a destination that communicate over the path computation domain managed by controller 100. Control unit 102 stores demands as a list of demands in the demands 18 data structure ("demands 18"). In some cases, the service provider or other administrator of network 6 may configure, via an administrative interface, one or more demands 18. In some cases, topology element 112 may additionally or alternatively derive projected demands 18 based on patterns of demands previously experienced by network 6.

Topology element 112 accepts demands to route traffic between the endpoints for the demands over the path computation domain. Demands may be requested for different times and dates and with disparate bandwidth requirements. Topology element 112 may reconcile demands from network services applications 104 to multiplex requested paths for the corresponding traffic onto the network 6 path computation domain based on demand parameters and network resource availability.

To intelligently compute a topology for network layer 6, topology element 112 may in some cases include topology module 116 to receive traffic engineering information, such as traffic engineering information 21 of FIG. 1, describing available resources of network 6, including routers 4 and interfaces thereof and interconnecting network links. Topology module 116 may execute one or more southbound protocols, such as Open Shortest Path First with Traffic Engineering extensions (OSPF-TE), Intermediate System to Intermediate System with Traffic Engineering extensions (ISIS-TE), BGP Link State (BGP-LS), to learn traffic engineering information for network 6.

Traffic engineering database (TED) 126 stores traffic engineering information, received by topology module 116, for network 6 that constitutes a path computation domain for controller 100. TED 126 may include one or more link-state databases (LSDBs), where link and node data is received in routing protocol advertisements, received from a topology server, and/or discovered by link-layer entities such as an overlay controller and then provided to topology module 116. In some instances, the service provider or other administrative entity may configure traffic engineering or other topology information within TED 126 via an administrative interface.

In accordance with techniques described in this disclosure and to satisfy demands 18 for network 6, topology computation module 114 of topology element 112 determines and optimizes paths for demands 18. Topology computation module 114 applies techniques described in this disclosure to iteratively determine solutions for demands 18 to facilitate a globally-optimized total resource cost to the network 6 and underlying transport network for transporting the traffic. Topology computation module 114 may represent an example instance of topology computation module 58 of FIG. 1.

To that end, topology computation module 114 obtains abstract link data 56 describing candidate links for network 6 and the shared-risks encountered by these candidate links on their physical (transport) paths, as well as information relevant to path optimization such as the physical length or delay of the link in some cases. Topology computation module 114 iteratively analyzes candidate links and other abstract link data in view of demands 18 to select a subset of the candidate links to efficiently and robustly carry traffic corresponding to demands 18.

Topology computation module 114 having selected and routed a subset of the candidate links for network 6, topology provisioning module 118 attempts to set the routed paths for the candidate links onto network 6. Topology provisioning module 118 of controller 100 may program the paths into network 6 to cause the state of network 6 to match the state of network 6 as determined by topology computation module 114. Topology provisioning module 118 may represent an example of topology provisioning module 26 of FIG. 1. Provisioning a path may require path validation prior to committing the path to provide for packet transport. Topology provisioning module 118 executes one or more southbound protocols for path provisioning to inject state into elements of network 6, such as any one or more of routers 4. A southbound protocol refers to a protocol by which components of controller 100 may communicate with network 6 elements, such as routers 4, to obtain or inject topology information, forwarding, and other network information that determines the operation of the network 4. For example, southbound protocols may include Path Computation Element (PCE) Communication Protocol (PCEP), Open Shortest Path First with Traffic Engineering extensions (OSPF-TE), Intermediate System to Intermediate System with Traffic Engineering extensions (ISIS-TE), BGP Link State (BGP-LS), NETCONF/Yang, Interface to the Routing System (I2RS) protocols, CLIs for the network elements; Simple Network Management Protocol (SNMP), and Open-Flow (or other SDN configuration protocol).

Topology module 116 may receive updated traffic engineering information from network 6, which may trigger dynamic re-computation by topology computation module 114 of a topology for network 6. For example, TED 126 upon receiving a new or updated TE link or receiving information that a TE link has failed may trigger topology computation module 114 to re-compute the paths, which may include respective diverse paths, for candidate links in order to account for the TED 126 change.

Topology computation module 114 may additionally/alternatively dynamically re-compute an updated network 6 topology on receipt on new or updated abstract link data 56. For example, updated abstract link data 56 may indicate a new SRLG for a link, which may indicate previously-diverse paths candidate now have a common SRLG and are thus no longer diverse with respect to SRLG. Topology computation module 114 may, as a result, re-compute diverse paths for the candidate link in order to again obtain diversity for the candidate link.

Figure 3:
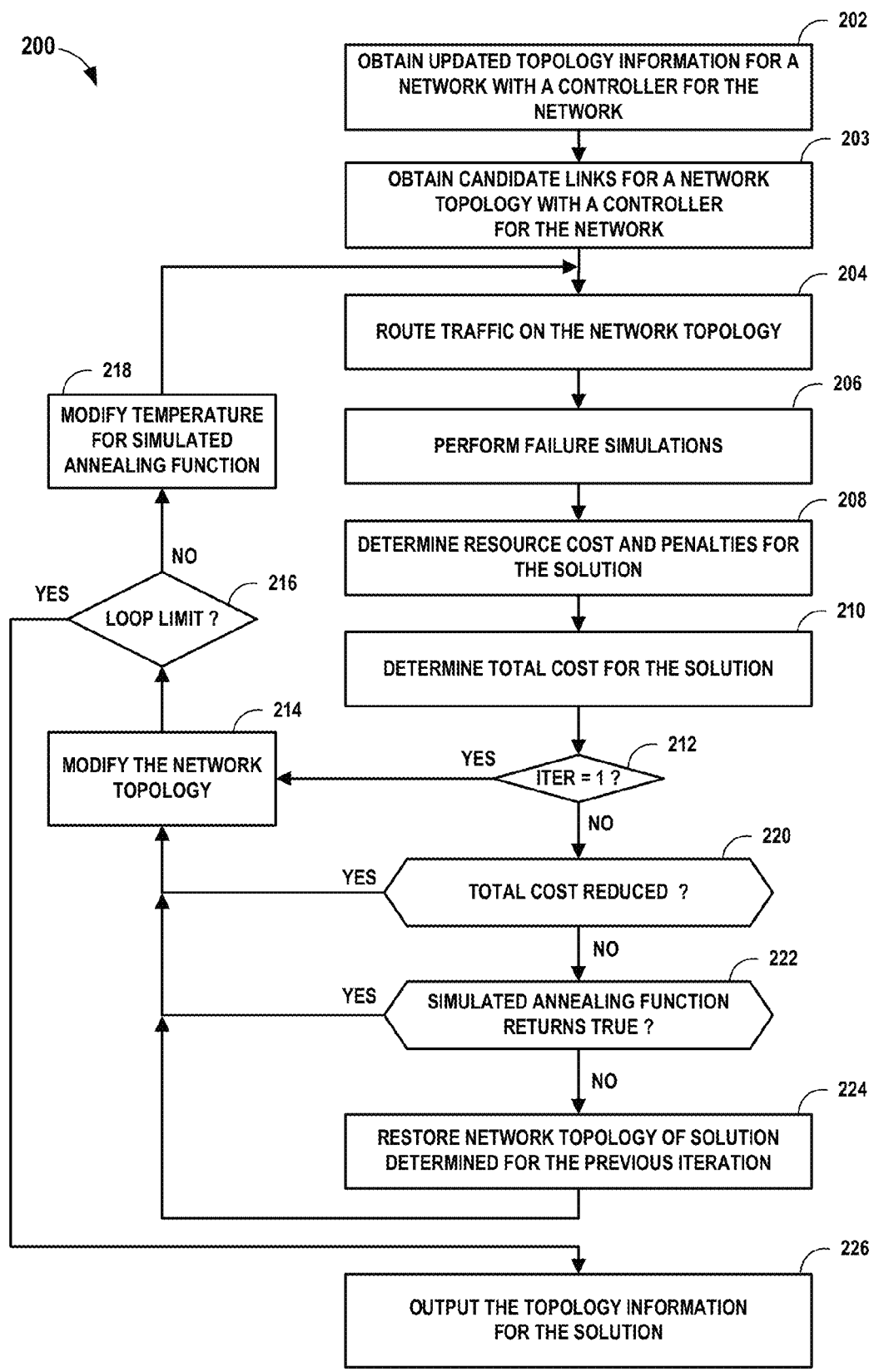
FIG. 3 is a flowchart illustrating an example mode of operation for one or more controllers to determine and optimize a logical network topology according to techniques described in this disclosure.

FIG. 3 is a flowchart illustrating an example mode of operation for one or more controllers to determine and optimize a logical network topology according to techniques described in this disclosure. Operation 200 is described with respect to controller 52 of FIG. 1 but may be applied by a decentralized control plane made up of multiple controllers or router control planes, for instance.

Topology computation module 58 obtains live topology information 21 for network 6 including routers 4 that in this example cooperatively implement an IP routing plane (202). Topology computation module 58 also obtains candidate links for network 6, the candidate links available for use in optimizing the logical network topology (203). The determined solution typically does not use all candidate links obtained, and controller 52 applies operation 200 to determine the subset of candidate links to use to build the lowest cost network topology. Topology computation module 58 may obtain candidate links by building the candidate links based on user-defined rules configured in or otherwise received by controller 52. Topology computation module 58 may route these newly-built links in transport network 54 to determine their actual physical lengths and the shared-risks (SRLGs) that the newly-built links encounter in their paths in the transport layer. In some cases, these paths are pre-computed when the calculation starts. To compute the paths, topology computation module 58 may calculate three paths and the optimisation algorithm is free to choose between these:

1. Shortest path
2. The shorter of the two paths on a calculated "shortest-diverse-cycle"
3. The longer of the two paths on a calculated "shortest-diverse-cycle"

Often the first two paths of these paths are identical but this is not necessarily the case. Topology computation module 58 may apply a "strong" diverse path algorithm that works well to find shortest diverse-cycle paths in complicated networks taking account of SRLG information if available. If a logical-link already exists and its path in the transport network 54 is known, then this can be read into topology computation module 58 and the known route can be fixed—and the diverse-path set described above is not determined. In some cases, because these paths are all pre-calculated before the applying operation 200, topology computation module 58 may not attempt to design the paths taking into account available wavelengths in the transport network 54. Topology computation module 58 instead assumes in such cases that the WDM capacity does not limit the design. Alternatively, the computation module may have information on the WDM resource constraints (e.g., obtained from abstract link data 56) and apply penalties to a solution if the solution does not meet these constraints. Once the path is selected, topology computation module 58 maps these paths to SRLG information for the IP links carried over each transport network 54 link section or node. Related to the transport paths, topology computation module 58 may in some instances have a user-configurable parameter for pruning the set of candidate links based on the number of IP nodes the links "bypass" in the transport layer. This allows the candidate link set to be reduced on the basis of the transport link topology and the equipment passed rather than on the basis of distance, for example.

Topology computation module 58 may alternatively receive abstract link data 56 that includes information describing candidate links. In some cases, abstract link data 56 is a file built as a data extraction from a third-party network management system for the transport layer. In some cases, a network operator for network 6 may build such a file by applying a script to or otherwise manipulating available transport layer data. Obtaining candidate link information directly in this way from abstract link data 56, e.g., provides only an abstract or restricted description of transport network 54 that does not include details of the transport layer topology. As a result, topology computation module 58 may apply more complicated constraints for determining selected candidate links. For example, a network operator may specify maximum counts, maximum delay, maximum capacity on any group of links, or SRLGs (or any combination thereof). Topology computation module 58 may apply such constraints to topology determination for network 6, where such constraints are "soft-constraints" in that solutions that violate the requirements of the constraints are not forbidden but rather receive a penalty cost that is added to the total network cost (topology computation module 58 iteratively applies steps of operation 200 to determine solutions that reduce or bring to zero these penalties).

Information describing the candidate links may include available links and associated link metrics, link costs, and/or SRLGs on the link. The combination of live topology information 21 for network 6 and the obtained candidate links define a network topology model for network 6. Topology computation module 58 routes the traffic demands for network 6 on the network topology model (204). Example detailed operations for routing traffic demands are included below with respect to FIGS. 4-5.

Topology computation module 58 then performs failure simulations with respect to the solution represented by the current network topology model including the current subset of candidate links over which topology computation module 58 has routed any of the traffic demands (206). The failure simulations determine penalties to be applied to the solution if, for instance, traffic cannot be protected, certain failure-resistance constraints are not met, or fixed equipment is required to exceed its constrained capacity in order to carry the traffic. Example details of a failure simulation are provided below with respect to FIG. 6.

Topology computation module 58 determines a resource cost to the network 4 for the solution and the penalties for the solution (in addition to those determined during the failure simulation) (208). To determine the resource costs for the purpose of optimization, topology computation module 58 determines a total resource cost of all the equipment in multi-layer network 60. Such costs may be based at least in part on link capacities (or "dimensions") needed to carry the traffic. The total resource cost formulas are operator-configurable, such that an operator may focus attention on a single measure of the network "costs" (such as total link "mileage" or "total interface count") or may use the formulas to gain a realistic measure of actual costs in order to form a fair comparison between different potential solutions. In some cases, the operation may add at least some component to the costs to reflect, e.g., that all else being equal "shorter-links" are better to use than "longer-links," etc. For instance, this may be reflected in the cost formula by adding a small component to the link costs that is proportional to distance. Such small changes to the cost formulas often make it very much easier for topology computation module 58 to identify an advantageous solution for large problems as topology computation module 58 can find some indication of the direction to steer the solution along the cost gradient. Topology computation module 58 in some cases may also attempt to do simple allocation of the node-equipment based on the number of links on the node and the traffic through it. As can be deduced from the above description, the optimum solution for a network where the costs are dominated by the interface (link) count will look very different to the optimum solution for a network where the costs are dominated by the link-mileage.

Topology computation module 58 additionally determines penalties for the solution. For example, the solution may violate one or more constraints having associated penalties. Such constraints may include, as noted above, maximum counts or maximum capacity on any group of links or SRLGs (or combination of the two). Topology computation module 58 may therefore determine which constraints are violated by the solution and apply the associated penalty. The failure simulations of step 206 may also accrue penalties for, e.g., traffic that cannot be routed in the solution under either normal or failure conditions. Topology computation module 58 accumulates the penalties applied to a solution and adds the accumulated total penalty cost to the total resource cost to determine a total cost for the solution (210).

For the initial run (iteration) of the optimization algorithm (YES branch of 212), topology computation module 58 does not perform a comparison with a previous solution but instead modifies the network topology (214). To modify the network topology of network 6, topology computation module 58 may either (1) select one of the candidate links to block by adding a high (but not infinite) penalty to the routing metric on the candidate link, (2) select a candidate link that had been previously blocked to 'unblock' by removing a penalty previously applied on the routing metric for the selected candidate link, or (3) (in some cases) routing the link on a different path in the transport layer such that the new path changes the shared-risk-groups encountered by the link in the logical network layer and the capacity requirements in the transport network 54. Topology computation module 58 may choose between blocking or unblocking and select a link according to a random function. Topology computation module 58 in some cases, however, may apply simple heuristics such as biasing more expensive links toward blocking and less expensive links toward unblocking, by biasing more toward blocking links that have very low traffic on them [e.g., a very low ratio (traffic carried)/(link cost)] and towards unblocking shorter links on busy node, or by biasing the selection such that active links that are on shared resource constraints at or above their constrained capacity may be preferentially selected for blocking.

Having modified the network topology for purposes of the algorithm, topology computation module 58 applies steps 204, 206, 208, and 210 to determine a new solution having newly routed traffic and to determine a total cost for the new solution. This is a subsequent iteration (NO branch of 212). Topology computation module 58 compares the total cost for the new solution with the total cost for the previous solution (220), and if the total cost has been reduced with the new solution (YES branch of 220), topology computation module 58 accepts the modified network topology and proceeds to step 214. If however the total cost has not been reduced with the new solution (NO branch of 220), topology computation module 58 applies a simulated annealing function to determine whether to accept the modified network topology despite the modified network topology leading to a larger total cost (222). In this way, topology computation module 58 may facilitate avoiding local minima of the total cost gradient to progress the solutions to a more globally-optimal solution. The simulated annealing function is a function that returns a positive result according to probability dependent on the magnitude of the cost increase and the iteration progress of the operation 200 (e.g., the number of iterations). As one example, the probability for the function may be defined as:

$$\exp\left(-\frac{\Delta C}{T}\right),$$

where $\Delta C$ is the magnitude of the cost increase vis-à-vis the previous solution and T is a "temperature" parameter that topology computation module 58 generally but not exclusively reduces as the number of iterations increases. If the simulated annealing function returns a positive result (YES branch of 222), topology computation module 58 proceeds to step 214. If the simulated annealing function returns true (NO branch of 222), which is typically more likely, topology computation module 58 rejects the modified network topology and restores the network topology determined for the previous iteration (224). In this way, topology computation module 58 may effectively jump out of a local minima.

Figure 6:
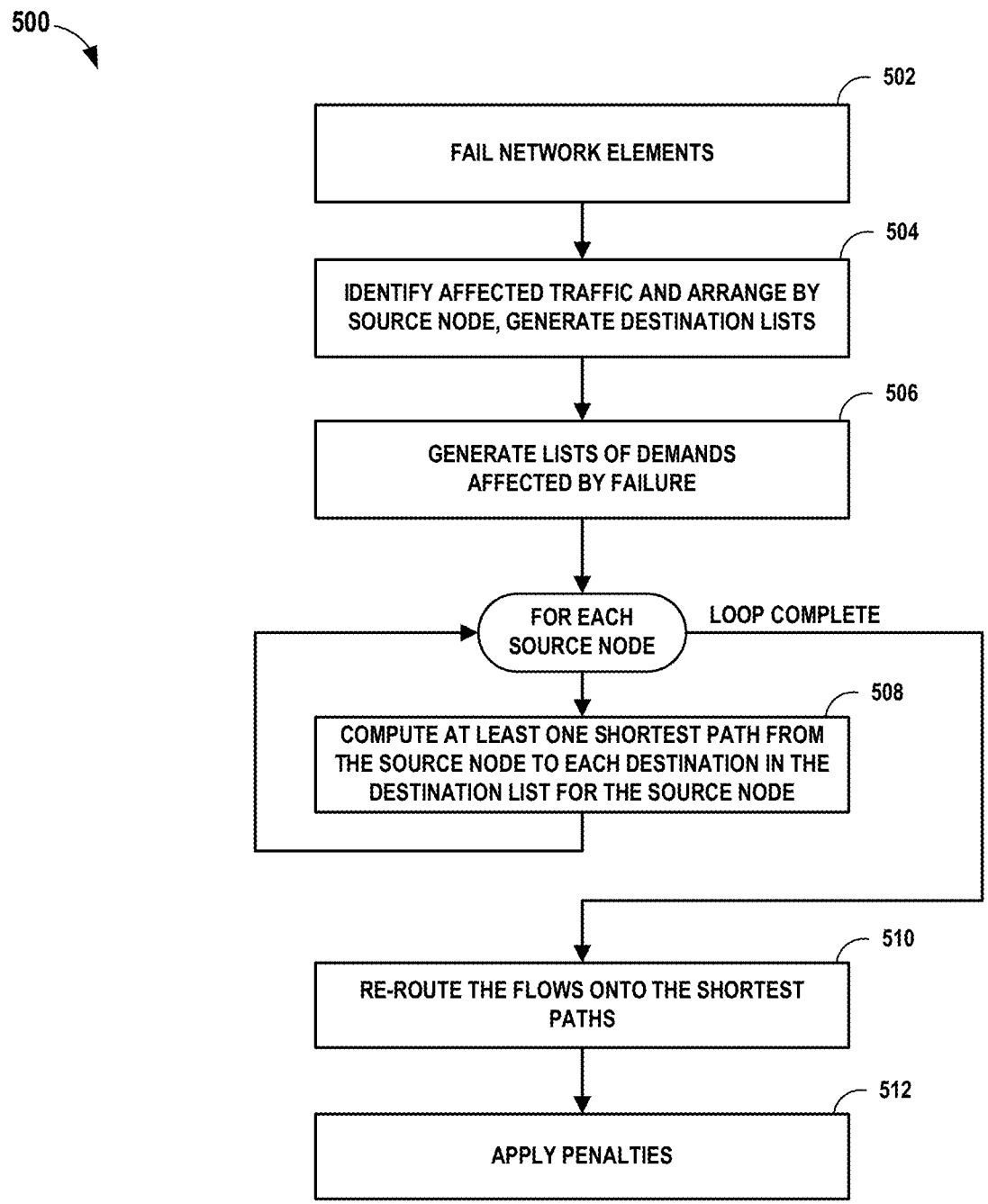
FIG. 6 is a flowchart illustrating an example mode of operation for failure simulation according to techniques described herein.
Figure 7:
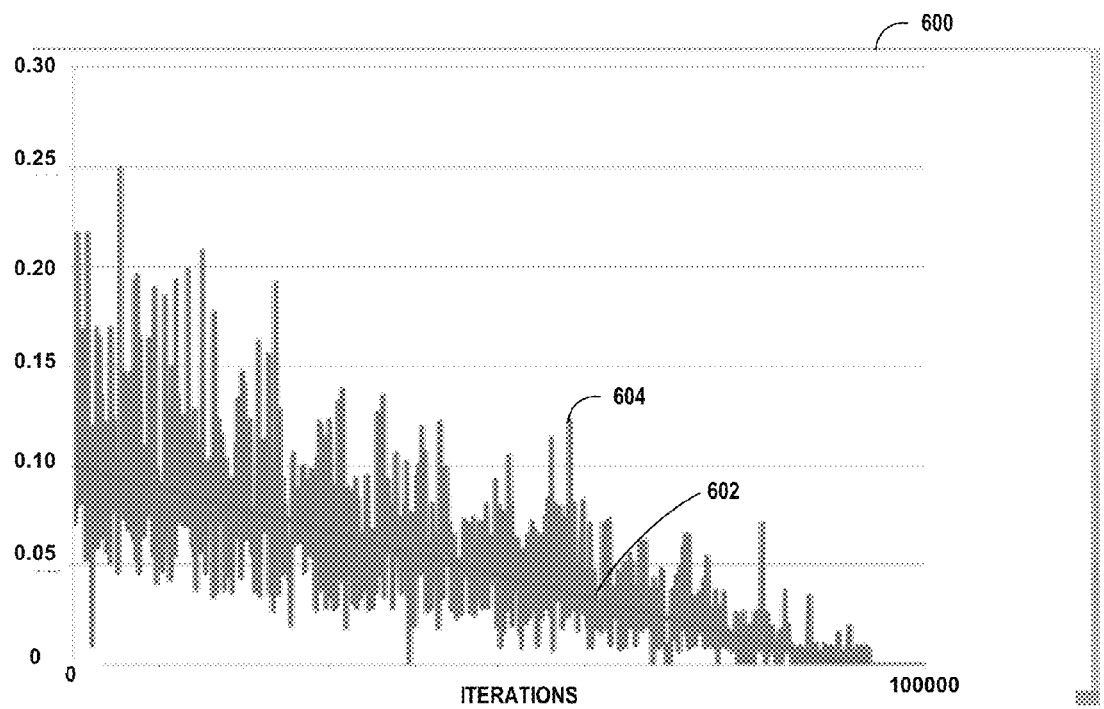
FIGS. 7-9 depict charts illustrating intermediate and final parameters and results during an example run to determine a network topology for a network according to techniques described in this disclosure.
Figure 8:
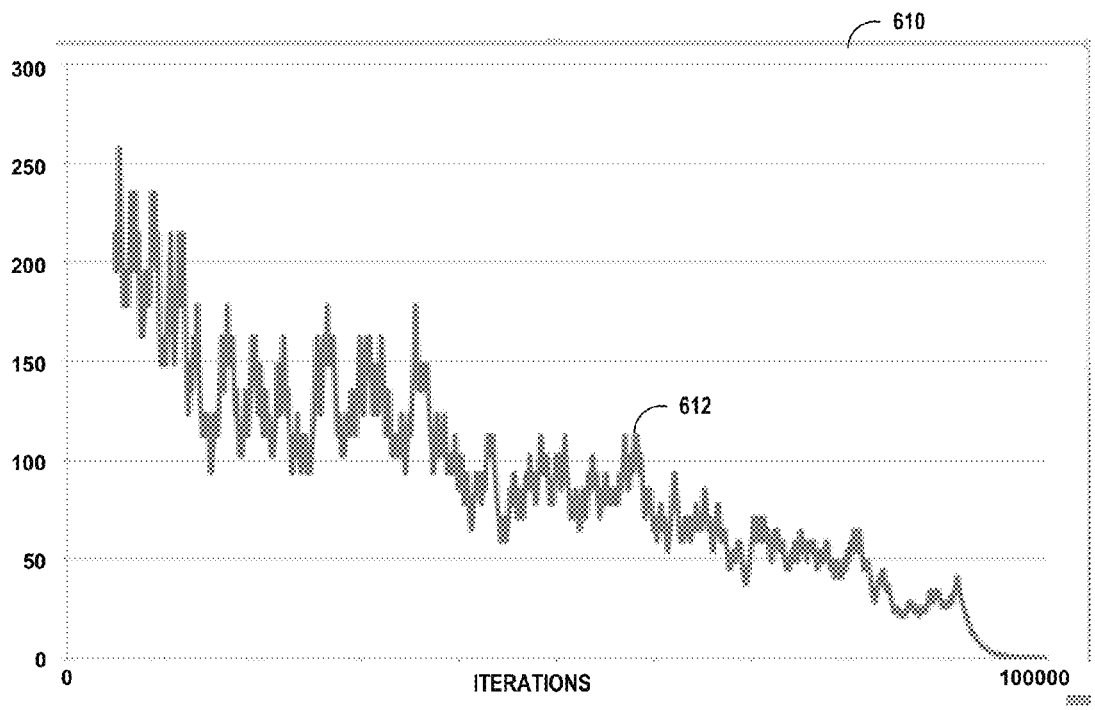

At step 214, topology computation module 58 modifies the network topology by blocking or unblocking one or more candidate links as described above (214). If the number of iterations to be performed has not been reached (NO branch of 216), topology computation module 58 modifies the temperature parameter for the simulated annealing function applied in step 222 (218). This reduction may be proportional to the number of iterations, based on configurable thresholds for the number of iterations, or some other scheme. Parameter T may be user-configurable or dependent on some aspect of the computation, such as the number of candidate links, or other aspect. To facilitate a global optimum algorithm, topology computation module 58 should spend as much time as possible in the temperature region where a reasonable percentage of the changes will increase the cost and then gradually reduce this percentage. As one example for determining T, at the start of the operation 200 topology computation module 58 sets a target percentage to 10% such that 10% of network topology modifications result in a cost increase. At the end the target percentage is set to 0%. During the iteration the target percentage is reduced linearly as the iteration progresses. For instance, every N iterations, topology computation module 58 will check the actual percentage of changes that increase the cost and check this against the target value. If the actual percentage is too high, then topology computation module 58 will decrease the parameter T. If this actual percentage is too low then topology computation module 58 will increase the parameter T. Example intermediate and final results of this process are depicted in FIGS. 6-8, below.

Once the iteration loop limit has been reached and the number of iterations to be performed are performed (YES of 216), topology computation module 58 exits the operation. In some cases, the iteration complete check of step 216 is based on other acceptance criteria, such as iterating: for a fixed elapsed time, until the total resource costs are less than some acceptable value, or until some other acceptance criteria is met. During the run of operation 200, topology computation module 58 stores the solution for the lowest-cost solution identified during any of the iterations. While the lowest-cost solution identified during operation 200 may not be globally optimal, the solution may nevertheless be optimized versus the initial determination or at least in some instances versus a solution that can be obtained in practice by alternative methods. Topology provisioning module 26 outputs the topology data determined for the solution, which may include the selected candidate links, to the transport layer to set up the selected candidate links to establish the determined network 6 topology (226). In some cases, topology provisioning module 26 configures the selected candidate links.

Figure 4:
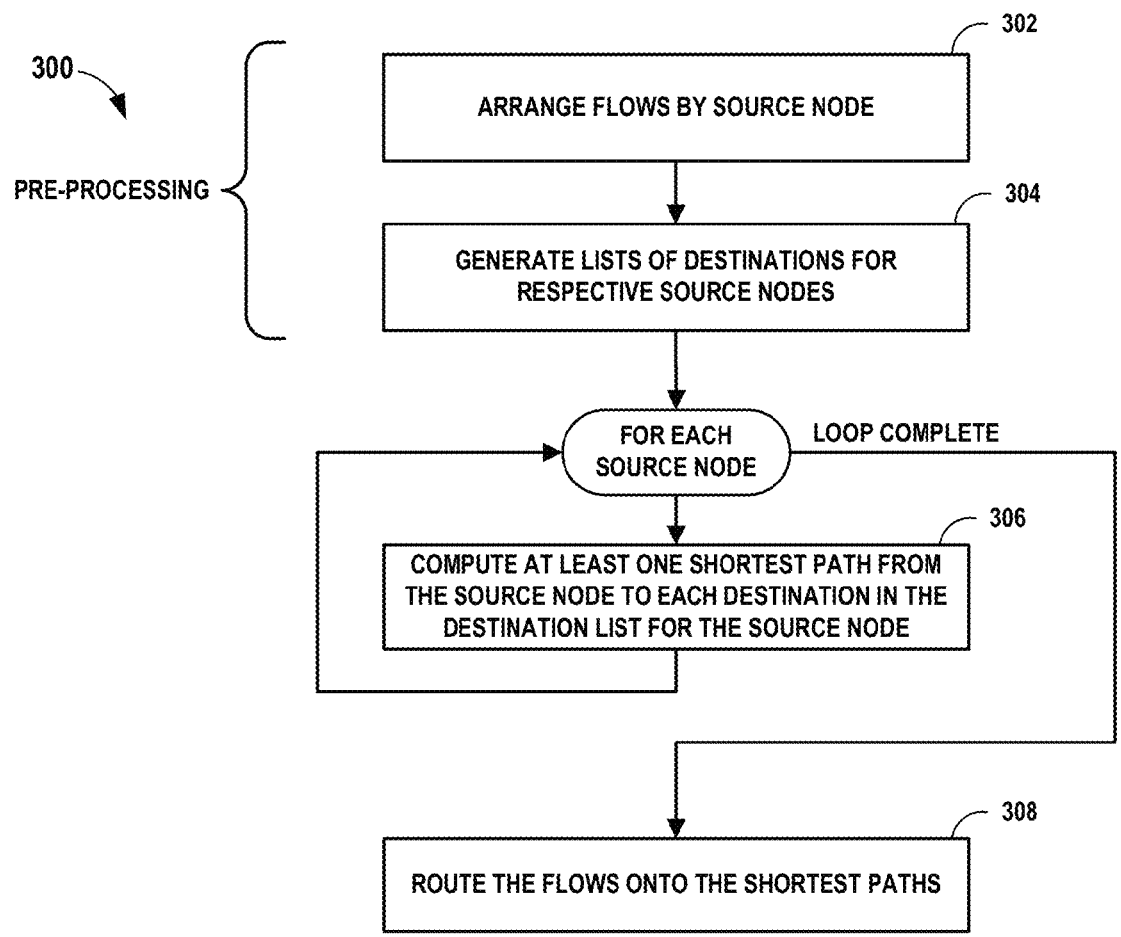
FIG. 4 is a flowchart illustrating an example mode of operation for a controller to route traffic onto a network.

FIG. 4 is a flowchart illustrating an example mode of operation for a controller to route traffic onto a network. Operation 300 is described with respect to controller 52 of FIG. 1 but may be applied by a decentralized control plane made up of multiple controllers or router control planes, for instance. Topology computation module 58 initially preprocesses a list of traffic demands to collate the list of traffic demands to be routed according to source node (e.g., one of routers 4) (302). For each source node, topology computation module 58 reviews the corresponding collated list to identify a list of destinations (e.g., any set of routers 4) for the source node (304).

Then, for each source node, topology computation module 58 computes at least one shortest path from the source node to each destination in the list of destinations in the source node (306). Topology computation module 58 may leverage the characteristic of an applied "open" shortest-path first (open SPF) algorithm that takes a similar amount of time to find the paths from a node to a single node as it does to find the paths from the node to all of the nodes. This takes advantage of the pre-processing steps 302, 304. Topology computation module 58 may in some cases use multiple cores (e.g., of multi-core computing platform 111 of FIG. 2) to execute multiple parallel threads to perform step 306. Computing shortest paths for each source node to its associated destination list is an independent operation and, thus, each of the multiple threads may independently compute shortest paths for different subsets of the set of various source nodes. For example, the pre-processing steps 302, 304 may result in a queue of source nodes, each source node requiring the computation of shortest paths, and the multiple threads may dequeue source nodes from the queue for processing to collectively perform step 306. To ensure synchronization, each source node may be associated with a mutex or other synchronization primitive. Additional details regarding computing constrained shortest paths and multi-threaded computation of shortest paths generally are found in David Wood, U.S. patent application Ser. No. 14/500,736, filed Sep. 29, 2014 and entitled "Batched Path Computation in Resource-Constrained Networks," which is incorporated by reference herein in its entirety.

In some cases, the at least one shortest path may include multiple equal-cost multipath (ECMP) paths. To find multiple ECMP paths taking different routes through the network the topology computation module 58 may invoke the shortest path algorithm several times and achieves different paths by swapping the link and path search order (additional example details described below with respect to FIG. 5). Having computed shortest paths, topology computation module 58 then routes the flows representing the traffic demands onto the shortest paths (308). Topology computation module 58 adds the traffic to the links of the shortest paths and to the intermediate nodes for the shortest paths. Where ECMP paths are available, topology computation module 58 may recursively split the traffic flows over the available ECMP paths, allocate traffic to the various paths by this recursive algorithm, and route the split traffic flows onto the network.

Figure 5:
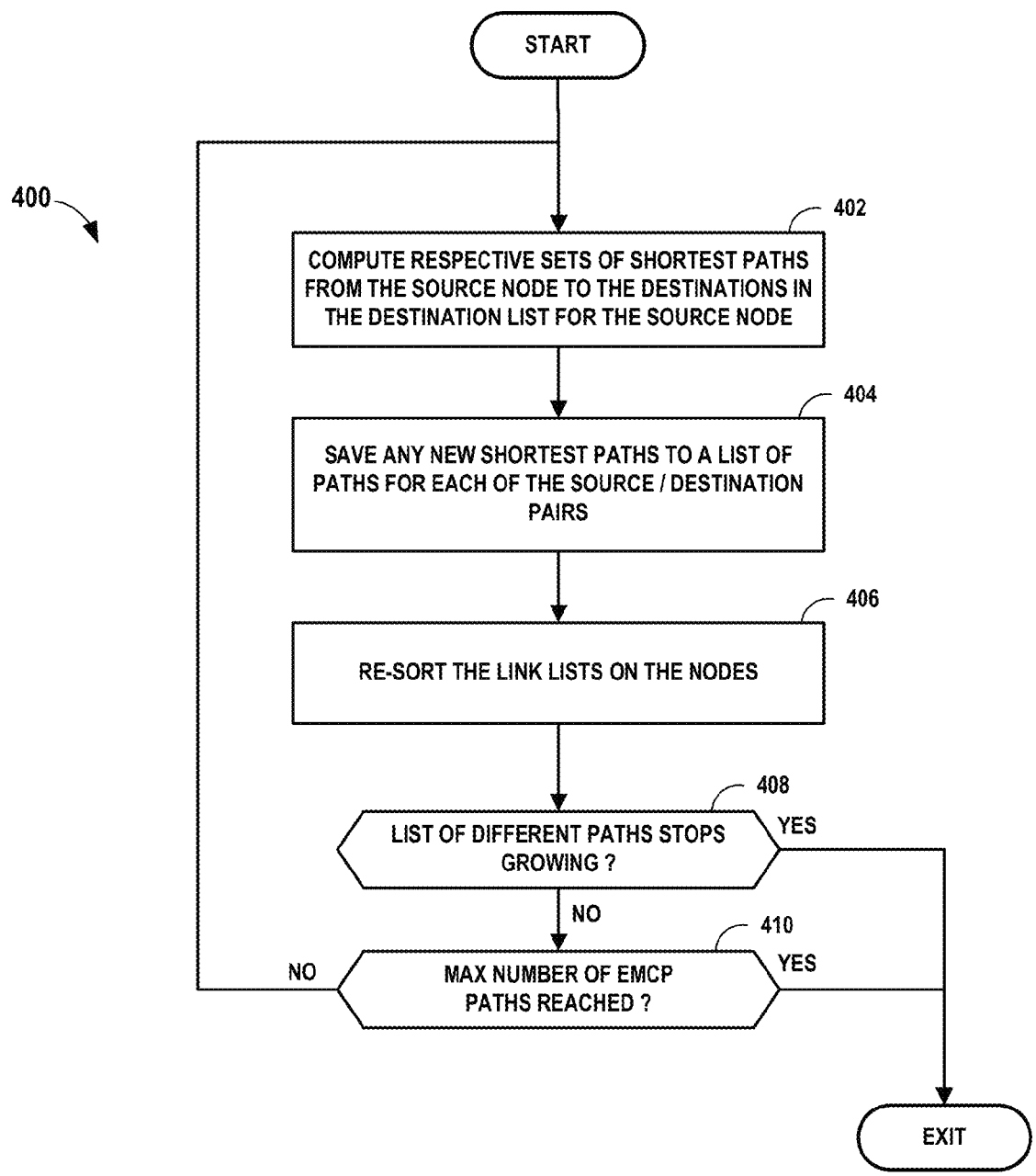
FIG. 5 is a flowchart illustrating an example mode of operation for determining multiple equal-cost multipath (UAW) paths according to techniques described herein.

FIG. 5 is a flowchart illustrating an example mode of operation for determining multiple equal-cost multipath (ECMP) paths according to techniques described herein. Mode of operation 400 may be an example implementation of at least part of step 306 of operation 300 of FIG. 4, and operation 400 is described with respect to controller 52 of FIG. 1.

The raw shortest path algorithm applied by topology computation module 58 finds the paths in the order of the links sorted on the nodes. Accordingly, if the links are re-sorted such that links with identical metrics appear in a different order, then the paths found will be different. The first time a re-sort is invoked, the order of links with the same metric is simply reversed. After the first invocation the order is randomly shuffled.

The other ordering in the shortest path algorithm comes from the order in which the list of nodes already connected is searched. As applied by topology computation module 58, this list of nodes is randomly shuffled and when a new connected node is found, it is placed in a random position in that list. Hence the shortest path algorithm will find different paths each time the algorithm is invoked, if there are ECMP paths associated.

Thus, topology computation module 58 iteratively computes shortest paths for the source nodes and re-sorts the various lists. The first step in the iteration is to compute at least one shortest path from the source node to each destination in the list of destinations in the source node (402). If any new shortest paths are identified, topology computation module 58 saves these are new ECMP paths for the source node (404). Topology computation module 58 may then re-sort the order of links sorted on the nodes and the ordering of the list of nodes already connected (406). Topology computation module 58 iterates around the loop until the list of ECMP paths for the source node stops growing (YES branch of 408) or a maximum number of ECMP paths is identified (YES branch of 410). The maximum number may be 5, 10, 12, or 15, for instance.

At this point, traffic demands have a list of ECMP paths associated with them. The ECMP load-balancing algorithm in the routers 4 of network 6 will split the traffic evenly across each branching path. Topology computation module 58 applies a recursive model of the above to allocate the traffic for a demand on each branching path to mimic this behavior.

An example shortest-path first algorithm for step 402, above, is provided in pseudocode as follows. The algorithm acts on arrays local to each node:

```
double * distanceCosts;
unsigned * routeMarks;
unsigned * searchEntryPoints;
unsigned * localDestinationMarks;
Node ** connectedNodes;
Path * pathTable;
```

The above local arrays could in some cases be pointers to the links or nodes themselves or iterator pointers in the lists, for example.

Initialize the algorithm:
Unset the routeMarks, search EntryPoints, etc.
Set the distances in the array and path table to a large number (FLT_MAX).
Mark the nodes in the destination list as special (the algorithm finishes when all are routed).
Inner Loop:

```
while (connectedNodeCount < nodeCount) {
    ● reset the minCost to a high number (FLT_MAX)
    ● unset the nearestNode pointer
    ● loop over the nodes already connected {
        ● currentNode = connectedNode[i];
            loop over the links attached to the currentNode {
                (starting from the last link used on that node)
                ● Find the other node attached to the link
                ● if(node already connected)
                    { increment the search entry pointer for the last link used on that
                    node }
                ● else {
                    ○ Calculate the "metric distance" to this node from the distance
                      to the connected node plus the link metric.
                    ○ If this distance is lower than the current minimum then {
                        ● Update the minDistance
                        ● Keep track of the connected node and the link used
                    }
                    // break out of the inner loop -- by definition the next link is the next-
                    nearest neighbor so no need to search further
                }
        }
    }
    ■ The nearest neighbor node from the inner loop is now the next node to be
      connected
    ■ Connect the nearest neighbor node.
        ● Set the path equal to the path to the connected node plus the link to it.
        ● Add to the connected node list.
            // put this into the list in random order so that different ECMP paths are
            found if the method is repeatedly called
    ■ If the new neighbor is in the destination list then mark it as done.
    ■ If all the nodes in the destination list have been reached, exit the loop.
}
```

Note that this algorithm appears to have 3-nested levels. However the innermost loop only iterates from the last link used on that node to the first neighbor not yet connected. Hence it typically only loops 1 or 2 times and the algorithm complexity is thereby reduced.

This algorithm using sorted links may provide a large speed up for the situation in which a node will have (at least in principle) a large number of possible links to use. For straightforward routing calculations on "normal" networks in which a node will typically only have a few neighbors there is some speed-up but the advantages may not be as substantial. Even so, the use of batch processing to find the routes to a list of destinations from a single source node will speed up the open-shortest path calculation in all circumstances.

As noted above, topology computation module 58 in above examples perform open SPF (interior gateway protocol (IGP)) routing computations and then set the capacity requirements on the network components based on this open routing. In some cases, path determination may instead or additionally use constrained SPF (CSPF) to design the network capacity requirements for a set of LSPs requiring with CSPF-based routing. In such cases, topology computation module 58 may modify the network topology model by modifying maximum capacities of the candidate links (or nodes) for network 6 rather than by simply blocking or unblocking. Topology computation module 58 may apply batched path computation techniques described in Wood, U.S. patent application Ser. No. 14/500,736, incorporated above, to perform CSPF computations in some cases.

FIG. 6 is a flowchart illustrating an example mode of operation for failure simulation according to techniques described herein. Mode of operation 500 may be an example implementation of at least parts of steps 204, 206 of operation 200 of FIG. 3, and operation 500 is described with respect to controller 52 of FIG. 1. In operation 500, topology computation module 58 determines the worst-case traffic level on the link and through the nodes, and topology computation module 58 uses this level to set the dimensions of the links and size of the nodes based on the through traffic routed to them.

Topology computation module 58 fails, in turn, multiple components for multi-layer network 60 (502). For example, topology computation module 58 may fail each candidate link used to route traffic for the solution, each of routers 4 through which traffic has been routed, each transport link (or SRLG if candidate links obtained as abstract links), each transport node (if known), and each site. The types of components failed may by be configurable by the network operator for network 6. For each failed component, topology computation module 58 identifies the affected traffic, arranges the affected traffic by source node, and generates destination lists for each source node (504). Topology computation module 58 generates lists of demands affected by the failure (506). For traffic originating or terminating at a failed node, topology computation module 58 may remove the traffic from the routed network model. For traffic passing through a failed component, topology computation module 58 attempts to re-route the traffic.

To re-route, topology computation module 58 determines shortest paths to destination for each affected source node (508). Step 508 may be similar to step 306 of FIG. 4. Topology computation module 58 re-routes the affected flows onto the shortest paths (510). Such re-routing may include recursively splitting re-routed traffic flows over available ECMP paths, routing the split traffic flows onto the network model, adding the traffic to the links and to intermediate nodes. In addition, topology computation module 58 may store data describing the worst-case traffic levels through the network model on the links and through the nodes (these may define the dimensions for these elements). Topology computation module 58 may also add a penalty for traffic that cannot be re-routed because of the failure (512). Operation 200 may incorporate all such penalties into the total cost for the solution.

Figure 9:
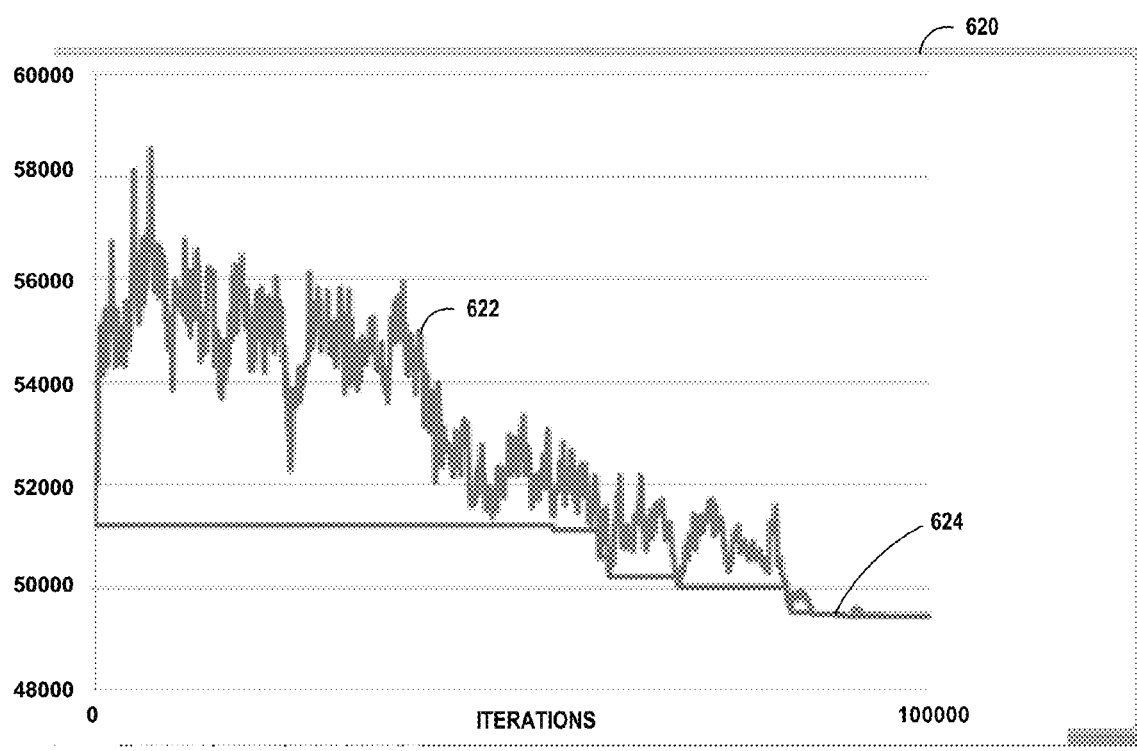

FIGS. 7-9 depict charts illustrating intermediate and final parameters and results during an example run to determine a network topology for a network according to techniques described in this disclosure. The charts are merely illustrative. FIG. 7 depicts chart 600 showing a target ratio 602 set by topology computation module 58 with the target probability that the value target ratio 602 for a given iteration will result in a cost increase. In this example, the initial target ratio for iteration 1 is set to 10%, and at the end the target percentage is set to 0%. During the iteration the target percentage is reduced linearly as the iteration progresses. For instance, every N iterations, topology computation module 58 will check the actual percentage of changes (depicted in chart 600 as actual ratio 604) that increase the cost and check this against the target value. If the actual percentage is too high, then topology computation module 58 will decrease the temperature parameter T for the simulated annealing function. If this actual percentage is too low then topology computation module 58 will increase the parameter T.

FIG. 8 depicts chart 610 of the temperature parameter T for the simulated annealing function for an example run to determine a network topology for a network according to techniques described in this disclosure. Chart 610 illustrates an erratic yet downward trend as topology computation module 58 adjusts the value of T to attempt meeting the target ratio 602 depicted in chart 600 of FIG. 6.

FIG. 9 depicts chart 620 illustrating intermediate and final total costs determined during an example run to determine a network topology for a network according to techniques described in this disclosure. Current total cost line 622 illustrates the total costs determined by topology computation module 58 for iterations of the algorithm. Best total cost line 624 illustrates the total cost for the lowest cost solution obtained by topology computation module 58 up to that point. Notably in this example, the initial iteration results in a best total cost that is not reached again until much further along in the run (after ~5,000). The solution in fact drifted to a significantly higher cost at first. The large discrepancy between the current total cost and the best total costs illustrates the importance of storing the best solution yet identified during the course of a run.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   obtaining, by a controller of a multi-layer network comprising a network layer and an underlying transport layer, abstract link data describing a plurality of candidate links, wherein each candidate link of the plurality of candidate links is routed in the transport layer and usable in network topologies for the network layer, and wherein the abstract link data indicates at least one Shared Risk Link Group for each of one or more of the plurality of candidate links;
   determining, by the controller based at least on the abstract link data, a first solution comprising a network topology for the network layer that includes a first selected subset of the candidate links;

determining, by the controller after generating a modified network topology based at least on the network topology, the abstract link data, and the at least one Shared Risk Link Group for each of one or more of the plurality of candidate links, a second solution comprising the modified network topology for the network layer that includes a second selected subset of the candidate links by applying a penalty cost to a first candidate link and a second candidate link of the second selected subset of the plurality of candidate links; and outputting, by the controller for configuring the multi-layer network, topology data for one of the first solution or the second solution having a lowest total cost, the lowest total cost including a total resource cost to the network for the one of the first solution or the second solution, and wherein the total cost of the second solution includes the penalty cost.

2. The method of claim 1, wherein obtaining abstract link data comprises receiving, by the controller, an abstract link data structure for the transport layer, the abstract link data structure including the abstract link data.

3. The method of claim 2, wherein receiving the abstract link data structure comprises receiving, by the controller from a network management system that manages a transport network that implements the transport layer, the abstract link data structure.

4. The method of claim 1, further comprising:
routing, by the controller, a plurality of traffic demands to the network topology, each traffic demand of the plurality of traffic demands representing an end-to-end traffic flow for the network layer.

5. The method of claim 4, further comprising:
determining, by the controller, the first selected subset of the candidate links by selecting candidate links on which the controller has routed a traffic demand of the plurality of traffic demands.

6. The method of claim 1, wherein the modified network topology comprises a first modified network topology, the method further comprising:
determining, by the controller after generating a second modified network topology based on the first modified network topology and in response to determining that the second solution has a lower total cost than the first solution, a third solution comprising the second modified network topology for the network layer that includes a third selected subset of the candidate links; and
determining, by the controller after generating a third modified network topology based on the network topology in response to determining that the second solution has a higher total cost than the first solution, a fourth solution comprising the third modified network topology for the network layer that includes a third selected subset of the candidate links.

7. The method of claim 1, further comprising:
determining, by the controller, a magnitude of a total cost increase for the second solution from the first solution; and
determining, by the controller, a result of a simulated annealing function based on the magnitude of the total cost increase and a temperature parameter.

8. The method of claim 7, further comprising:
setting, by the controller, the temperature parameter according to a target probability for the simulated annealing function, the target probability being a probability that a total cost for the second solution from the first solution increases.

9. A method comprising:
obtaining, by a controller of a multi-layer network comprising a network layer and an underlying transport layer, abstract link data describing a plurality of candidate links, wherein each candidate link of the plurality of candidate links is routed in the transport layer and usable in network topologies for the network layer;
determining, by the controller based at least on the abstract link data, a first solution comprising a network topology for the network layer that includes a first selected subset of the candidate links;
determining, by the controller after generating a first modified network topology based at least on the network topology and the abstract link data, a second solution comprising the modified network topology for the network layer that includes a second selected subset of the candidate links;
determining, by the controller, a magnitude of a total cost increase for the second solution from the first solution;
determining, by the controller, a result of a simulated annealing function based on the magnitude of the total cost increase and a temperature parameter;
determining, by the controller after generating a second modified network topology based on the first modified network topology and in response to determining that the second solution has a lower total cost than the first solution and only if the result of the simulated annealing function is positive, a third solution comprising the second modified network topology for the network layer that includes a third selected subset of the candidate links and outputting, for configuring the multi-layer network, topology data for the third solution; and
determining, by the controller after generating a third modified network topology based on the network topology in response to determining that the second solution has a higher total cost than the first solution and only if the result of the simulated annealing function is negative, a fourth solution comprising the third modified network topology for the network layer that includes a third selected subset of the candidate links and outputting, for configuring the multi-layer network, topology data for the fourth solution.

10. The method of claim 1, further comprising:
routing, by the controller, a plurality of traffic demands to the network topology, each traffic demand of the plurality of traffic demands representing an end-to-end traffic flow mapped to a label-switched path for the network layer.

11. A controller for a multi-layer network comprising a network layer and an underlying transport layer, the controller comprising:
one or more processors coupled to a memory;
a topology computation module configured for execution by the one or more processors to:
obtain abstract link data describing a plurality of candidate links, wherein each candidate link of the plurality of candidate links is routed in the transport layer and usable in network topologies for the network layer, and wherein the abstract link data indicates at least one Shared Risk Link Group for each of one or more of the plurality of candidate links;

determine, based at least on the abstract link data, a first solution comprising a network topology for the network layer that includes a first selected subset of the candidate links; and determine, after generating a modified network topology based at least on the network topology, the abstract link data, and the at least one Shared Risk Link Group for each of one or more of the plurality of candidate links, a second solution comprising the modified network topology for the network layer that includes a second selected subset of the candidate links by applying a penalty cost to a first candidate link and a second candidate link of the second selected subset of the plurality of candidate links; and a topology provisioning module configured for execution by the one or more processors to output, for configuring the multi-layer network, topology data for one of the first solution or the second solution having a lowest total cost, the lowest total cost including a total resource cost to the network for the one of the first solution or the second solution, wherein the total cost of the second solution includes the penalty cost.

12. The controller of claim 11, wherein to obtain the abstract link data the topology computation module receives an abstract link data structure for the transport layer, the abstract link data structure including the abstract link data.

13. The controller of claim 12, wherein to receive the abstract link data structure the topology computation module receives, from a network management system that manages a transport network that implements the transport layer, the abstract link data structure.

14. The controller of claim 11, wherein the topology computation module is further configured for execution by the one or more processors to:

route a plurality of traffic demands to the network topology, each traffic demand of the plurality of traffic demands representing an end-to-end traffic flow for the network layer.

15. The controller of claim 14, wherein the topology computation module is further configured for execution by the one or more processors to:

determine the first selected subset of the candidate links by selecting candidate links on which the controller has routed a traffic demand of the plurality of traffic demands.

16. The controller of claim 11, wherein the modified network topology comprises a first modified network topology, and wherein the topology computation module is further configured for execution by the one or more processors to:

determine, after generating a second modified network topology based on the first modified network topology and in response to determining that the second solution has a lower total cost than the first solution, a third solution comprising the second modified network topology for the network layer that includes a third selected subset of the candidate links; and determine, after generating a third modified network topology based on the network topology in response to determining that the second solution has a higher total cost than the first solution, a fourth solution comprising the third modified network topology for the network layer that includes a third selected subset of the candidate links.

17. The controller of claim 11, wherein the topology computation module is further configured for execution by the one or more processors to:

determining, by the controller, a magnitude of a total cost increase for the second solution from the first solution; and determining, by the controller, a result of a simulated annealing function based on the magnitude of the total cost increase and a temperature parameter.

18. A non-transitory computer-readable medium comprising instructions for causing one or more programmable processors of a controller of a multi-layer network comprising a network layer and an underlying transport layer:

obtain abstract link data describing a plurality of candidate links, wherein each candidate link of the plurality of candidate links is routed in the transport layer and usable in network topologies for the network layer, and wherein the abstract link data indicates at least one Shared Risk Link Group for each of one or more of the plurality of candidate links;

determine, based at least on the abstract link data, a first solution comprising a network topology for the network layer that includes a first selected subset of the candidate links;

determine, after generating a modified network topology based at least on the network topology, the abstract link data, and the at least one Shared Risk Link Group for each of one or more of the plurality of candidate links, a second solution comprising the modified network topology for the network layer that includes a second selected subset of the candidate links; and output, for configuring the multi-layer network, topology data for one of the first solution or the second solution having a lowest total cost, the lowest total cost including a total resource cost to the network for the one of the first solution or the second solution, wherein the total cost of the second solution includes the penalty cost.

* * * * *